US011556921B2

(12) United States Patent
Senter et al.

(10) Patent No.: US 11,556,921 B2
(45) Date of Patent: Jan. 17, 2023

(54) AUTOMATING DIGITAL ASSET TRANSFERS BASED ON HISTORICAL TRANSACTIONS

(71) Applicant: Lolli, Inc., Durham, NC (US)

(72) Inventors: Matthew Senter, Durham, NC (US); Jarrad Giles, Morrisville, NC (US); Alex Adelman, Brooklyn, NY (US)

(73) Assignee: Lolli, Inc., Durham, NC (US)

( * ) Notice: Subject to any disclaimer, the term of this patent is extended or adjusted under 35 U.S.C. 154(b) by 0 days.

(21) Appl. No.: 16/799,473

(22) Filed: Feb. 24, 2020

(65) Prior Publication Data

US 2020/0250657 A1 Aug. 6, 2020

Related U.S. Application Data

(63) Continuation of application No. PCT/US2020/015981, filed on Jan. 30, 2020.

(60) Provisional application No. 62/798,726, filed on Jan. 30, 2019.

(51) Int. Cl.
| | |
|---|---|
| *G06Q 20/36* | (2012.01) |
| *G06Q 20/06* | (2012.01) |
| *G06Q 20/02* | (2012.01) |
| *G06Q 20/38* | (2012.01) |
| *G06Q 30/02* | (2012.01) |
| *G06Q 30/06* | (2012.01) |

(52) U.S. Cl.
CPC ......... *G06Q 20/3678* (2013.01); *G06Q 20/02* (2013.01); *G06Q 20/0658* (2013.01); *G06Q 20/3674* (2013.01); *G06Q 20/3676* (2013.01); *G06Q 20/381* (2013.01); *G06Q 30/0214* (2013.01); *G06Q 30/0615* (2013.01)

(58) Field of Classification Search
CPC ............... G06Q 20/3678; G06Q 20/02; G06Q 20/0658; G06Q 20/3674; G06Q 20/3676; G06Q 20/381; G06Q 30/0214; G06Q 30/0615
See application file for complete search history.

(56) References Cited

U.S. PATENT DOCUMENTS

| | | | |
|---|---|---|---|
| 9,892,460 B1 | 2/2018 | Winklevoss et al. | |
| 10,783,545 B2* | 9/2020 | Swamidurai | ....... G06Q 30/0233 |
| 2009/0259532 A1* | 10/2009 | Bergstraesser | ......... G06Q 30/02 |
| | | | 705/14.4 |

(Continued)

OTHER PUBLICATIONS

International Search Report and Written Opinion in corresponding International Patent Application No. PCT/US20/15981, dated Aug. 16, 2021, 9 pages.

*Primary Examiner* — John W Hayes
*Assistant Examiner* — Taylor S Rak
(74) *Attorney, Agent, or Firm* — Bochner IP, PLLC; Ariel Reinitz

(57) ABSTRACT

Systems and methods are disclosed for automating digital asset transfers based on historical transactions. In one implementation, a notification corresponding to a first transaction or operation associated with a first entity is received. Based on the notification, a second transaction or operation is initiated with respect to one or more digital tokens. One or more digital tokens are received in response to the second transaction. At least one of the one or more digital tokens, as secured via one or more cryptographic keys, is stored in a wallet associated with the first entity.

20 Claims, 3 Drawing Sheets

(56) References Cited

U.S. PATENT DOCUMENTS

| | | |
|---|---|---|
| 2015/0052056 A1 | 2/2015 | Serebrennikov |
| 2015/0254639 A1 | 9/2015 | Radu |
| 2015/0324789 A1 | 11/2015 | Dvorak et al. |
| 2016/0071096 A1* | 3/2016 | Rosea .................... G06Q 20/36 705/67 |
| 2016/0321752 A1 | 11/2016 | Tabacco et al. |
| 2019/0108543 A1* | 4/2019 | Chan .................. G06Q 30/0229 |
| 2019/0259025 A1* | 8/2019 | Hilton ................... G06Q 40/12 |
| 2019/0370788 A1* | 12/2019 | Aronson ................... G06F 8/24 |
| 2020/0034869 A1* | 1/2020 | Harrison ............ G06Q 20/3678 |
| 2020/0349558 A1* | 11/2020 | Serebrennikov ... G06Q 20/0655 |

* cited by examiner

US 11,556,921 B2

AUTOMATING DIGITAL ASSET TRANSFERS BASED ON HISTORICAL TRANSACTIONS

CROSS-REFERENCE TO RELATED APPLICATIONS

This application is a continuation of International Application No. PCT/US2020/015981, filed Jan. 30, 2020, which is related to and claims the benefit of U.S. Patent Application No. 62/798,726, filed Jan. 30, 2019, each of which is incorporated herein by reference in its entirety.

TECHNICAL FIELD

Aspects and implementations of the present disclosure relate to data processing and, more specifically, but without limitation, to automating digital asset transfers based on historical transactions.

BACKGROUND

Data/records can be stored on a decentralized or distributed ledger such as blockchain that is synchronized across multiple computing/storage devices. Various cryptographic techniques can be utilized to secure such records.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Aspects and implementations of the present disclosure are directed to automating digital asset transfers based on historical transactions.

Existing digital asset and cryptographic frameworks are often technically complex and require substantial technical familiarity to utilize. As a result, many users who may otherwise benefit from such digital assets, do not utilize them.

Accordingly, described herein in various implementations are technologies that automate various aspects of the manner in which digital assets (such as cryptocurrencies) can be earned by a user. The described technologies enable users with little to no familiarity with such digital assets to begin to accumulate such assets in connection with routine activities/transactions. Having accumulated such digital assets, users can be empowered to utilize such assets towards future transactions.

It can therefore be appreciated that the described technologies are directed to and address specific technical challenges and longstanding deficiencies in multiple technical areas, including but not limited to cryptography, cybersecurity, and distributed ledger technology ("DLT"). As described in detail herein, the disclosed technologies provide specific, technical solutions to the referenced technical challenges and unmet needs in the referenced technical fields and provide numerous advantages and improvements upon conventional approaches. Additionally, in various implementations one or more of the hardware elements, components, etc., referenced herein operate to enable, improve, and/or enhance the described technologies, such as in a manner described herein.

Figure 1:
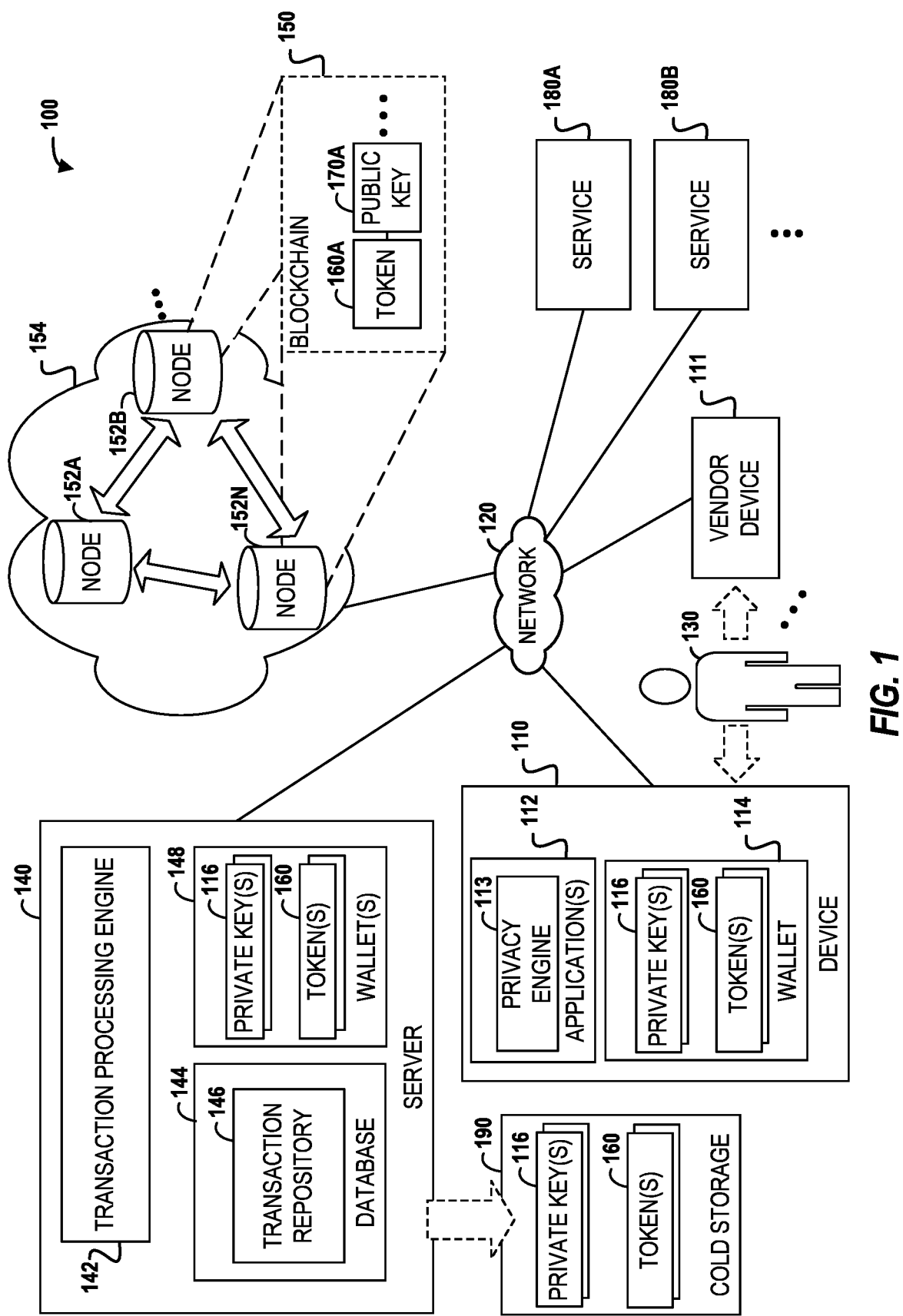
FIG. 1 illustrates an example system, in accordance with an example embodiment.

FIG. 1 illustrates an example system 100, in accordance with some implementations. As shown, the system 100 includes components such as device 110. Device 110 can include a laptop computer, a desktop computer, a terminal, a mobile phone, a tablet computer, a smart watch, a wearable device, a personal digital assistant (PDA), a digital music player, a connected device, a speaker device, a server, and the like. User 130 can be a human user who interacts with one or more device(s) 110. For example, user 130 can provide various inputs (e.g., via an input device/interface such as a keyboard, mouse, touchscreen, microphone, etc.) to device 110. Device(s) 110 can also display, project, and/or otherwise provide content to user 130 (e.g., via output components such as a screen, speaker, etc.).

As shown in FIG. 1, device(s) 110 can include one or more application(s) 112. Such applications can be programs, modules, or other executable instructions that configure/enable the device to interact with, provide content to, and/or otherwise perform operations on behalf of user 130. Examples of such applications include but are not limited to: internet browsers, mobile apps, ecommerce applications, social media applications, personal assistant applications, games, etc. By way of further illustration, application(s) 112 can include mobile apps that enable users to initiate various transactions with third party services 180, such as food delivery services, ride sharing services, ecommerce services, travel services, credit card services, etc.

Figure 3:
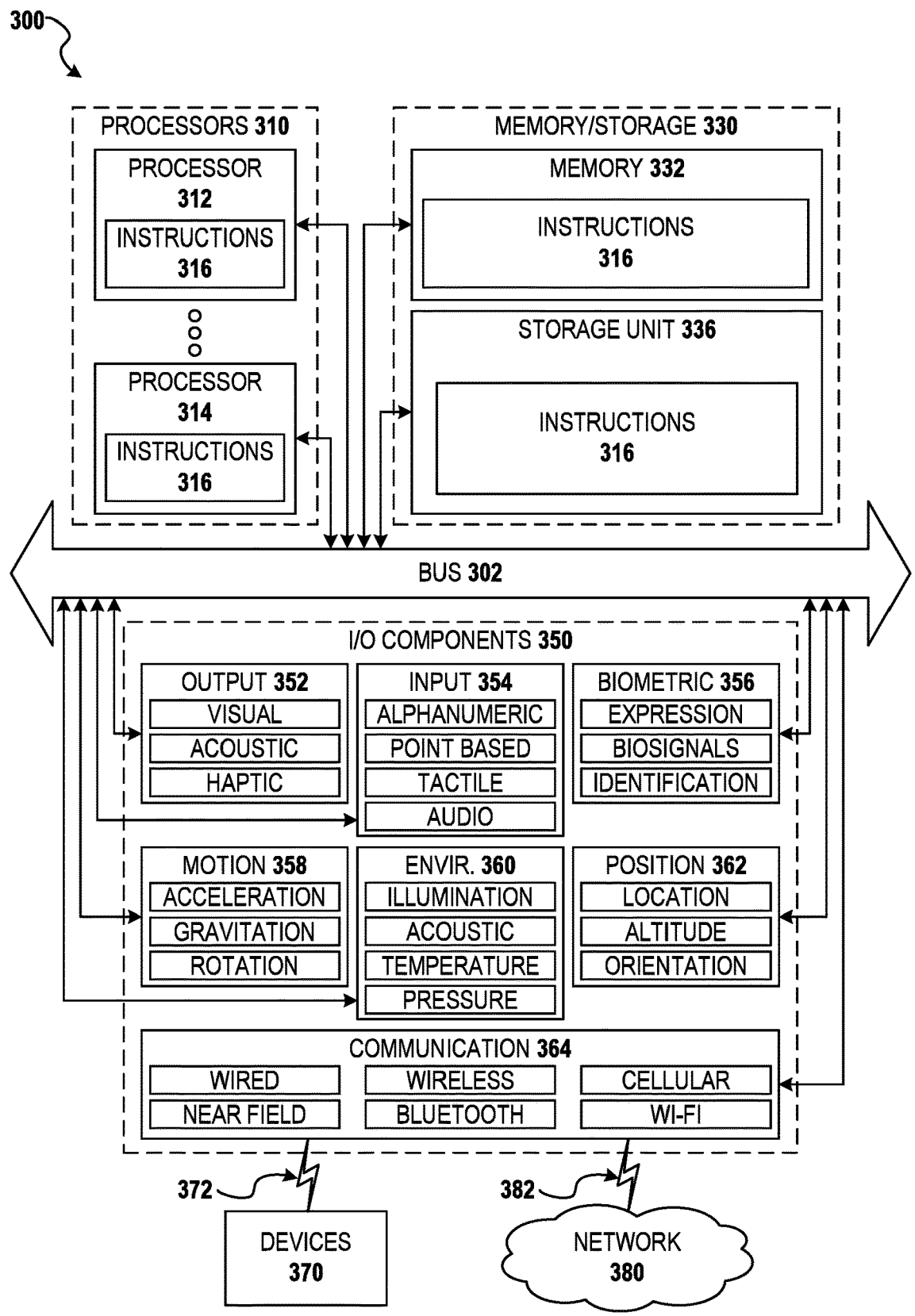
FIG. 3 is a block diagram illustrating components of a machine able to read instructions from a machine-readable medium and perform any of the methodologies discussed herein, according to an example embodiment.

Application(s) 112 can be stored in memory of device 110 (e.g. memory 330 as depicted in FIG. 3 and described below). One or more processor(s) of device 110 (e.g., processors 310 as depicted in FIG. 3 and described below) can execute such application(s). In doing so, device 110 can be configured to perform various operations, present content to user 130, etc.

As shown in FIG. 1, in certain implementations, application(s) 112 can include privacy engine 113. Privacy engine 113 can be one or more programs, modules, or other executable instructions that configure device 110 and/or one or more other application(s) 112 to generate a representation of a network address (e.g., URL) and/or a portion or segment thereof. Doing so can be advantageous in numerous scenarios and can enhance and ensure data privacy and security with respect to activities and operations initiated by user 130, as described herein.

For example, in a scenario in which user 130 visits various websites (e.g., ecommerce websites) via a web browser, privacy engine 113 can generate a representation (e.g., a hash) of each such URL (or a portion or segment thereof). Such a generated representation can be provided or transmitted, e.g., to server 140. Upon receiving the generated representation, server 140 can process the representation (e.g., in relation to an index or table that includes various URLs through which qualifying or associated transactions or other operations are to be further processed, e.g., as described herein). In doing so, the described technologies can ensure that only transactions relevant for further processing (e.g., with respect to transferring digital tokens) are accessible to server 140. Other activity (e.g., visits to websites not enrolled or configured with respect to the described technologies) are not determinable by server 140 (e.g., the hashed representation is not determined). In doing so, the described technologies enhance and ensure data privacy and security with respect to activities and operations initiated by user 130.

These and other described features, as implemented with respect to one or more particular machine(s), can improve the functioning of such machine(s) and/or otherwise enhance numerous technologies including those enabling the security, execution, and management of various digital transactions and operations, as described herein.

In certain implementations, device 110 can also include wallet 114. Wallet 114 can be, for example, a hardware component (e.g., memory) or a software application configured to store digital token(s) 160, which may be secured via private key(s) 116. Such private key(s) 116 can be cryptographic keys (e.g., a string of bits used by a cryptographic algorithm to transform plain text into cipher text or vice versa) that may be kept secret by a party and used to sign transactions (e.g., the transfer of a digital token from one party to another, as described herein). In other implementations, such private keys can be stored in 'cold storage,' e.g., on a device or element that is not accessible to external devices.

It should be noted that while application(s) 112 and wallet 114 are depicted and/or described as operating on a device 110, this is only for the sake of clarity. However, in other implementations such elements can also be implemented on other devices/machines. For example, in lieu of executing locally at device 110, aspects of application(s) 112 can be implemented remotely (e.g., on a server device or within a cloud service or framework).

As also shown in FIG. 1, device 110 can connect to and/or otherwise communicate with services 180, server 140, and blockchain network 154 via network 120. Network 120 can include one or more networks such as the Internet, a wide area network (WAN), a local area network (LAN), a virtual private network (VPN), an intranet, satellite, and the like.

Service 180A and service 180B (collectively, services 180) can be for example, third-party services that enable users to initiate transactions and/or other operations. Examples of such transactions/operations include but are not limited to purchasing goods for shipment, placing restaurant/food orders for delivery, requesting taxi dispatch, booking travel accommodations or tickets, and/or any other such services. In certain implementations, user 130 can initiate a transaction with such a service via an application (e.g., a web browser or dedicated mobile application) executing on device 110.

In certain implementations, application(s) 112 and/or service(s) 180 can be configured to track, monitor, and/or otherwise maintain records with respect to various aspects associated with the origination of such transaction(s). For example, the use of various tracking/referral links can enable a service to identify the source (e.g., an entity, individual, website, etc.) through which the user initiated the referenced transaction. Having identified such a source, certain services may initiate further transaction(s), such as by providing various forms of compensation or commissions to such referral sources. In certain scenarios, such compensation may be transmitted upon satisfaction of certain criteria (e.g., purchases within certain categories, after a product return interval has passed, etc.).

Moreover, in certain implementations the described technologies can be configured with respect to transactions initiated (e.g., by user 130) with respect to vendor device 111. Vendor device 111 can be, for example, a point-of-sale ("POS") device or other such payment or transaction terminal. In certain implementations, vendor device 111 may be deployed at a retail establishment or at other locations.

In one example scenario, user 130 can initiate a transaction or other operation(s) via vendor device 111. By way of illustration, user 130 can provide one or more account identifiers (e.g., a credit/debit card or card number, etc.) in connection with a purchase at a 'brick and mortar' store. In such a scenario, vendor device 111 can provide notification of such transaction(s) (e.g., to server 140), and various digital token(s) can be transferred as a result, as described in detail herein. Additionally, in certain implementations the location of user 130, device 110, and/or vendor device 111 can be utilized to facilitate various transactions and/or other operations, as described in further detail herein.

Server 140 can be, for example, a server computer, computing device, storage service (e.g., a 'cloud' service), etc. In certain implementations, server 140 can be configured to maintain various affiliate/referral relationships with service(s) 180. For example, server 140 can be configured to direct, refer, or proxy user 130 (who may be seeking to initiate a purchase, transaction, etc.) to such services. Each respective service can further maintain protocols, etc., whereby subsequent transactions/other operations (e.g., commission payments) are initiated based on transactions directed by or referred from a particular server.

Server 140 can include transaction processing engine 142, database 144, and wallet(s) 148. Transaction processing engine 142 can be an application that configures/enables service 140 to process/track the described transactions, coordinate the conversion of various commissions into cryptocurrencies, and coordinate storage of or distribution of such cryptocurrencies for/to the users initiating such transactions, as described herein.

Database 144 can be a storage resource such as an object-oriented database, a relational database, a non-relational database (e.g., NoSQL), a blockchain or other such distributed or decentralized storage resource, etc. In certain implementations, various repositories such as transaction repository 146 can be defined and stored within database 144. Transaction repository 146 can be, for example, a ledger of various transactions initiated by users through referrals, links, etc. In certain implementations, such links may originate from server 140. Such a ledger can reflect or incorporate, for example, information corresponding to such transactions, including but not limited to data identifying the user/user account, a transaction amount, a commission amount, a timestamp, etc.

As noted, in certain implementations service(s) 180 can initiate various further transactions, such as by directing or providing affiliate/referral commissions to server 140. Moreover, in certain implementations, upon receiving the referenced affiliate/referral commissions from service 180, transaction processing engine 142 can configure server 140 to convert such commissions, e.g., into cryptocurrencies and/or other digital assets.

The referenced cryptocurrencies can be implemented in conjunction with a decentralized or distributed ledger such as a blockchain 150. As shown in FIG. 1, blockchain 150 can be distributed/stored across multiple connected nodes 152. Such nodes 152 can be computing devices, storage devices, and/or any other such connected devices or components configured to generate and/or provide verification (e.g., for a transaction, operation, etc.). Various nodes can be connected to one another (directly or indirectly) via various network connections, thereby forming a distributed computing environment or network 154.

In certain implementations, consensus algorithm(s) can be applied in relation to the referenced nodes. Such nodes may be employed in a permissioned or permissionless environment (e.g., using techniques such as proof-of-work, proof-of-stake or delegated proof-of-stake, etc. to map the nodes that participate in the protocol).

In an example transaction, ownership of a digital token 160A can be transferred from one address to another (e.g., within blockchain 150). To authenticate the transaction, the transaction recording the transfer can be signed by the originating party using a private key associated with that originating party (e.g., as stored on a device). Such a private key can be a cryptographic key (e.g., a string of bits used by a cryptographic algorithm to transform plain text into cipher text or vice versa) that may be kept secret by a party and used to sign transactions (e.g., the transfer of a token to another user, server, etc.) such that they may be verified using the described distributed computing environment.

The referenced signed transaction can then be broadcast across the distributed computing environment/network 154, where it can be verified by one or more node(s) 152, e.g., using the public key 170A associated with the originating party. Such a public key can be a cryptographic key distributed or available to the referenced node(s) 152 such that signed transactions associated with the public key can be verified by the node(s).

Accordingly, upon receiving the referenced affiliate/referral commissions from a service 180 (e.g., in fiat currency), transaction processing engine 142 can configure server 140 to convert such commissions into cryptocurrencies via blockchain 150. In certain implementations, such conversion can be performed via a cryptocurrency or digital asset exchange, and/or based on one or more market rates of exchange.

In certain implementations, digital token(s) associated with or corresponding to the referenced conversion can be stored in wallet(s) 148 at server 140. In certain implementations, such token(s) 160 can be secured via private key(s) 116 associated with the user. The value associated with such digital token(s) can be associated with and/or attributable to various transactions within transaction repository 146. For example, digital token(s) corresponding to the value of the commissions paid for a particular purchase can be attributed to and/or associated with such a purchase (and/or the user that initiated the purchase) as reflected within transaction repository 146. It should be understood that, as used herein, the terms "digital token," "digital tokens," "token," or "tokens" can refer to a single token, multiple tokens, a fraction of a token, or any combination or variation thereof.

Additionally, in certain implementations the referenced digital token(s) 160 can be stored in custodial wallets maintained at server 140. For example, transaction processing engine 142 can create and maintain such a wallet on behalf of user 130. Upon receiving commissions (e.g., from services 180) attributable to transactions initiated by user 130, and converting such commissions into digital tokens (as described herein), transaction processing engine 142 can store the digital token(s) 160 (as secured via private key(s) 116) in a wallet maintained at server 140 for such a user.

In other implementations, the described technologies can allocate or associate previously transferred/acquired digital token(s) to a wallet, user, etc. For example, in lieu of converting commissions into digital tokens via a digital asset exchange after a transaction initiated by user 130, in certain implementations server 140 can maintain or otherwise access reserves of such digital tokens (e.g., which may have been acquired/transferred prior to a given transaction by user 130). Accordingly, upon receiving notification of a transaction by the user, digital token(s) from such a reserve can be allocated or transferred to the user. In doing so, the user can gain prompt or immediate access to such token(s) (e.g., in lieu of awaiting conversion of a commission prior to gaining access to the digital token).

Moreover, in certain implementations the referenced digital token(s) 160 can be stored in cold storage 190. Cold storage 190 can be, for example, a device or element that is not accessible (or not continuously accessible) to external devices. For example, in certain implementations digital token(s) 160 associated with substantial amounts of cryptocurrency (e.g., amounts above a defined threshold) can be transferred to/stored in cold storage 190 (e.g., as secured via private key(s)). By way of further example, digital token(s) that have been allocated to a given user for more than a defined period of time (e.g., over one week ago) can be transferred to/stored in cold storage 190. Doing so can increase the security of such cryptocurrency, digital tokens, etc.

These and other described features, as implemented with respect to one or more particular machine(s), can improve the functioning of such machine(s) and/or otherwise enhance numerous technologies including those enabling the security, execution, and management of various digital transactions and operations, as described herein.

While many of the examples described herein are illustrated with respect to a single server 140, this is simply for the sake of clarity and brevity. However, it should be understood that the described technologies can also be implemented (in any number of configurations) across multiple servers and/or other computing devices/services.

It can therefore be appreciated that the described technologies provide numerous technical advantages and improvements over existing technologies. For example, the described technologies enable users to accumulate ownership of digital assets (and a wallet within which private keys are stored) in an automated manner. Additionally, in certain implementations the described technologies can be configured to enable users to utilize such accrued digital assets with respect to fiat transactions (e.g., with respect to subsequent purchases from the services described herein). Moreover, by maintaining a transaction ledger in connection with such digital assets, ownership of such assets can be restored or reconciled in scenarios in which a security breach or fraudulent activity may otherwise compromise ownership of such assets.

In certain implementations, the described technologies can also leverage the described transaction ledger to incentivize or promote the use of accumulated digital assets towards subsequent transactions. For example, the described transaction ledger can reflect that a user accumulated a defined amount of cryptocurrency (e.g., 0.01 Bitcoin) based on a specific transaction (e.g., purchase of a "SmartPhone 5" device from "BigMart"). Accordingly, in certain implementations various promotions can be initiated whereby such a user can be incentivized to utilize such an amount of cryptocurrency (0.01 Bitcoin) towards a subsequent purchase at the same store ("BigMart"), a related purchase (e.g., an accessory for "SmartPhone 5"), etc. In doing so, retailers and/or manufacturers can effectively re-target customers determined to be likely to be purchasers of certain products, and users can benefit from previously-unavailable promotions.

Additionally, in certain implementations the described technologies can be configured to enable users to utilize digital tokens in subsequent transactions (e.g., purchases from services 180). For example, as described above, transaction processing engine 142 can create and/or maintain a wallet (e.g., at server 140) that stores digital tokens earned by the user (e.g., based on commissions from prior transactions). Accordingly, in certain implementations the described technologies can further enable a user to utilize the tokens stored in such a wallet (e.g., as secured via private key(s)) with respect to subsequent transactions, e.g., in scenarios in which services 180 accept payment via such tokens. Similarly, the described technologies can also enable the user to transfer the referenced tokens (e.g., those stored in such a wallet at server 140) directly to another user (e.g., with respect to peer-to-peer transactions/payments), including, for example, another user associated with another wallet maintained at server 140 or elsewhere.

Moreover, in certain implementations the described technologies can be configured to enable users to utilize digital tokens in subsequent transactions, even in scenarios in which services 180 may not accept payment via digital tokens. For example, as described above, server 140 can maintain a wallet on behalf of user 130 that stores digital tokens earned by the user (e.g., based on commissions from prior transactions) and/or private key(s) associated with the user. As noted, in certain implementations such token(s) can be stored in the referenced wallet as secured via private key(s) associated with the user. In scenarios in which the user wishes to utilize such digital tokens with respect to transactions in fiat currency, the described technologies can be configured to convert the referenced token(s) into a corresponding amount of fiat currency, and complete the transaction based on such conversion. In doing so, the described technologies can enable a user to hold the referenced digital tokens while also facilitating use to such tokens, even in scenarios in which a transaction is to be executed in fiat currency.

Further aspects and features of server 140 and device(s) 110 and are described in more detail in conjunction with FIGS. 2-3, below.

As used herein, the term "configured" encompasses its plain and ordinary meaning. In one example, a machine is configured to carry out a method by having software code for that method stored in a memory that is accessible to the processor(s) of the machine. The processor(s) access the memory to implement the method. In another example, the instructions for carrying out the method are hard-wired into the processor(s). In yet another example, a portion of the instructions are hard-wired, and a portion of the instructions are stored as software code in the memory.

Figure 2:
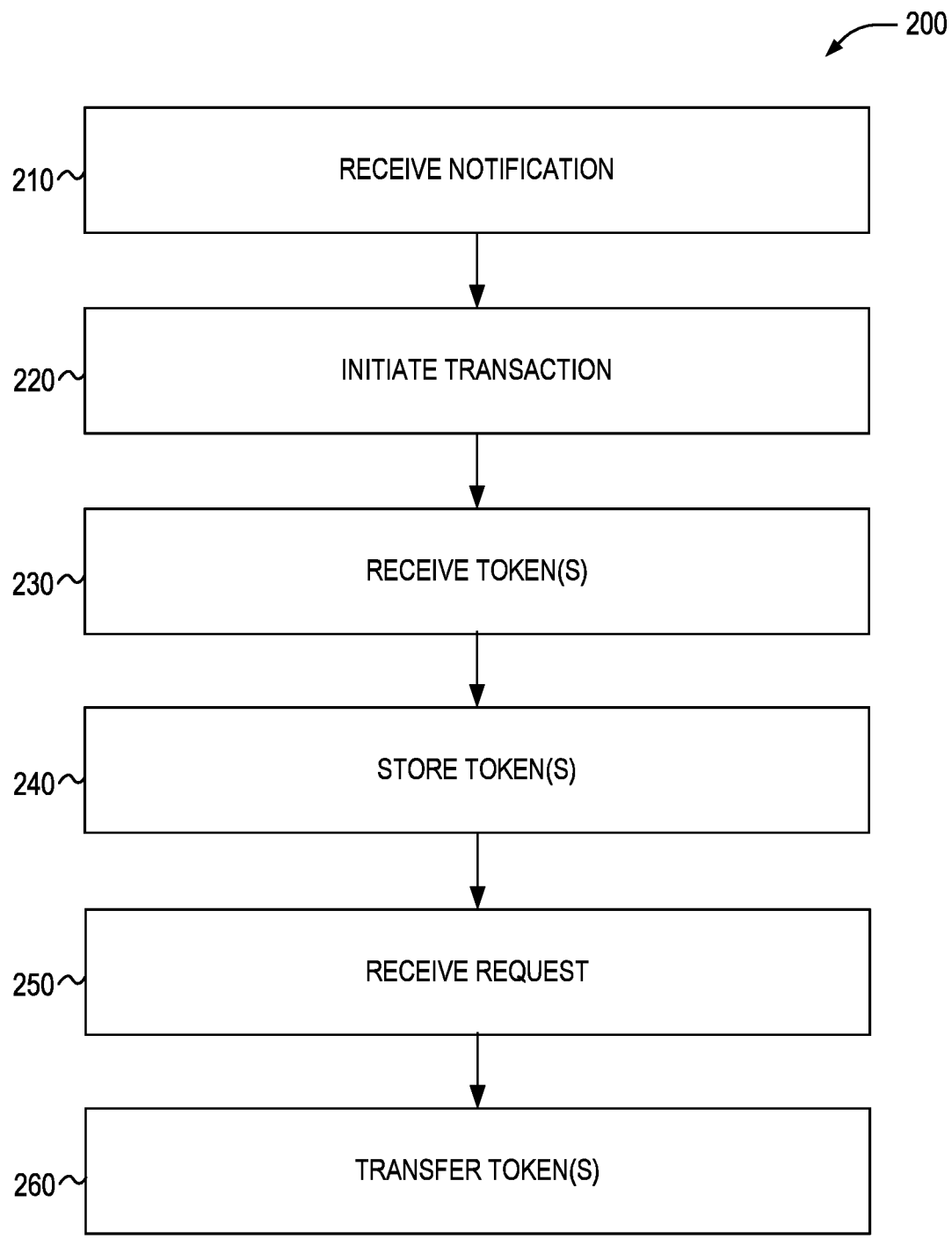
FIG. 2 is a flow chart illustrating a method, in accordance with example embodiments, for automating digital asset transfers based on historical transactions.

FIG. 2 is a flow chart illustrating a method 200, according to an example embodiment, for automating digital asset transfers based on historical transactions. The method is performed by processing logic that can comprise hardware (circuitry, dedicated logic, etc.), software (such as is run on a computing device such as those described herein), or any combination thereof. In one implementation, the method 200 is performed by one or more elements depicted and/or described in relation to FIG. 1 (including but not limited to server 140, transaction processing engine 142, and/or device 110), while in some other implementations, the one or more blocks of FIG. 2 can be performed by another machine or machines.

For simplicity of explanation, methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

At operation 210, a notification is received. In certain implementations, such a notification can correspond to a first transaction, operation, etc. For example, as shown in FIG. 1, and described herein, user 130 can initiate an ecommerce purchase from an ecommerce retailer, website, etc. (e.g., service 180A). In conjunction with such a transaction, device 110 and/or service 180A can provide or transmit information associated with such a transaction/operation which can be received by server 140. Moreover, in certain implementations server 140 can request and/or receive a log of purchases made by various users via provided referral/affiliate links.

Additionally, in certain implementations, in lieu of providing 'raw' data associated with such a transaction, device 110 and/or service 180A can generate and provide a representation (e.g., a hash) of aspect(s) of such a transaction. For example, in lieu of providing network address(es) associated with various websites visited by user 130, device 110 and/or service 180A can generate and provide a hashed representation of such a network address and/or portions thereof. Such a representation can then be processed by server 140 (e.g., in relation to an index, table, etc., reflecting sites, services, etc. that are enrolled, e.g., such that transaction processing engine 142 is configured to proceed, as described herein). In doing so, the privacy and security of the operation of the described technologies can be enhanced by ensuring that server 140 identifies specifically those transactions eligible for further processing (and not unrelated web browsing activity).

Additionally, as described in detail herein, in certain implementations the described technologies can be implemented with respect to 'brick and mortar' transactions, e.g., transactions initiated by user 130 with respect to vendor device 111. In doing so, for example, transactions associated with user 130 can be directed to server 140 (e.g., by registering a credit card of the user with server 140 and/or service 180A). In such a scenario, notifications corresponding to transactions or other operations initiated by user 130 via an account identifier (e.g., a credit/debit card, bank account information, or other such identifier(s) through which payment or transactions can be initiated) can be generated and provided to server 140. For example, user 130 can register a debit/credit card such that transactions or other operations executed via the registered card qualify for commissions or other compensation, promotions, rewards, etc. Upon initiating or executing transactions via such an account identifier, an institution that manages or administers the account identifier (e.g., a bank that issues a credit card) can provide notification(s) of such transactions/operations, e.g., to server 140. Based on such notifications, commissions or other rewards can be accounted for and converted/ transferred to digital assets, tokens, etc. (and stored in a wallet associated with the user), as described herein.

At operation 220, a second transaction/operation is initiated. In certain implementations, such a transaction, operation, etc. can be initiated based on/in response to the notification received at 210. Additionally, in certain implementations such a transaction can be a transaction initiated with respect to one or more digital tokens. For example, transaction processing engine 142 can configure server 140 to convert various payments (which are received in fiat currency) into digital tokens (e.g., Bitcoin, Ethereum, etc.) via blockchain 150. By way of further illustration, as described herein, the described technologies can initiate an exchange of digital token(s) (e.g., Bitcoin, etc.) to the first entity (e.g., the user that initiated the transaction/operation at 210).

Moreover, in certain implementations the described technologies can allocate digital tokens to such an entity (e.g., user 130). For example, as described herein, in lieu of converting fiat commission payments to digital assets, the described technologies can maintain reserves of such digital assets (e.g., maintained in wallet 148 or elsewhere). Accordingly, upon receiving a notification that commissions are due to a particular user, the described technologies can allocate a portion of such reserves to the user. In doing so, the user may gain prompt or immediate access to such assets (e.g., in lieu of converting fiat currency into digital assets via an exchange). Such an arrangement can be advantageous, e.g., in enabling user 130 to securely utilize such digital assets immediately.

At operation 230, one or more digital tokens are received. In certain implementations, such digital tokens (e.g., a single token, multiple tokens, a fraction of a token, etc.) can be received in response to the second transaction (e.g., at 220). Moreover, in certain implementations such tokens can be secured via private cryptographic keys (which can correspond to the referenced token(s)), as described herein. Additionally, as noted above, in certain implementations the described technologies can maintain reserves of digital tokens/asset which can be promptly allocated or provided to the user (e.g., without conversion via an exchange).

At operation 240, one or more digital tokens are stored. In certain implementations, such tokens can be stored as secured (e.g., encrypted, signed, etc.) via one or more first cryptographic keys (e.g., keys associated with the user). Moreover, in certain implementations such token(s) and/or keys can be stored in a wallet associated with an entity, user, etc., that initiated the initial transaction (e.g., the transaction, operation, etc. from which the corresponding affiliate/referral commission originates).

By way of illustration, in certain implementations such digital token(s) and/or key(s) can be associated with and/or stored in relation to aspect(s) of the transaction(s) from which such token(s) were earned. For example, as described herein, transaction repository 146 can store and maintain various details regarding transaction(s) or other operation(s) initiated by user 130, such as those through which certain digital tokens/assets were earned. Accordingly, the described technologies can further generate and provide various notifications. For example, as described herein, digital assets that are transferred or allocated to a user based on a transaction associated with a particular item can be utilized to facilitate or incentivize further related or complementary transactions. By way of illustration, the same vendor through which the initial transaction was generated (e.g., service 180A) and/or another vendor (e.g., service 180B) can generate and provide promotional content, pricing offers, etc., with respect to items complementary to the initial transaction. In doing so, the described technologies can further incentivize user 130 to utilize digital assets the user has earned in the manner described herein.

Moreover, in certain implementations the described technologies can be configured to transfer one or more digital tokens, e.g., to cold storage or another secure storage medium. In certain implementations, such tokens can be secured, e.g., via one or more second cryptographic keys (e.g., a new cryptographic key generated with respect to the associated user). In other implementations, such digital tokens can be allocated to the first entity and/or transferred to another walled (e.g., a software wallet associated with the first entity), etc., as described herein.

For example, in certain implementations digital token(s) associated with substantial amounts of cryptocurrency (e.g., amounts above a defined threshold) can be transferred to/stored in cold storage 190. By way of further example, digital token(s) that have been allocated to a given user for more than a defined period of time (e.g., over one week ago) can be transferred to/stored in cold storage 190. Doing so can increase the security of such cryptocurrency, digital tokens, etc. and can further improve and/or otherwise enhance the functioning of one or more particular machine(s) including those enabling the security, execution, and management of various digital transactions and operations, as described herein.

At operation 250, a request is received. in certain implementations, such a request can be a request to transfer one or more digital token(s), such as token(s) stored in a wallet associated with the first entity (e.g., the user that initiated the transaction/operation at 210). For example, having allocated and/or transferred such digital token(s) to user 130, the user can utilize such digital assets to initiate other transactions, send such digital token(s) to other users/wallets, etc., as described in detail herein.

At operation 260, one or more digital token(s) can be transferred. In certain implementations, such digital token(s) can be transferred in response to the request (e.g., as received at 250). Moreover, in certain implementations such digital token(s) can be transferred to a second entity (e.g., another user, such as a user also associated with a wallet as depicted in FIG. 1), as described herein. In other implementations, such digital token(s) can be transferred, allocated, etc., to an entity associated with the first transaction (e.g., an ecommerce vendor, merchant, etc., with respect to which the digital assets were initially earned).

It should also be noted that while the technologies described herein are illustrated primarily with respect to transaction processing and digital asset management, the described technologies can also be implemented in any number of additional or alternative settings or contexts and towards any number of additional objectives.

Certain implementations are described herein as including logic or a number of components, modules, or mechanisms. Modules can constitute either software modules (e.g., code embodied on a machine-readable medium) or hardware modules. A "hardware module" is a tangible unit capable of performing certain operations and can be configured or arranged in a certain physical manner. In various example implementations, one or more computer systems (e.g., a standalone computer system, a client computer system, or a server computer system) or one or more hardware modules of a computer system (e.g., a processor or a group of processors) can be configured by software (e.g., an application or application portion) as a hardware module that operates to perform certain operations as described herein.

In some implementations, a hardware module can be implemented mechanically, electronically, or any suitable combination thereof. For example, a hardware module can include dedicated circuitry or logic that is permanently configured to perform certain operations. For example, a hardware module can be a special-purpose processor, such as a Field-Programmable Gate Array (FPGA) or an Application Specific Integrated Circuit (ASIC). A hardware module can also include programmable logic or circuitry that is temporarily configured by software to perform certain operations. For example, a hardware module can include software executed by a programmable processor. Once configured by such software, hardware modules become specific machines (or specific components of a machine) uniquely tailored to perform the configured functions. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering implementations in which hardware modules are temporarily configured (e.g., programmed), each of the hardware modules need not be configured or instantiated at any one instance in time. For example, where a hardware module comprises a processor configured by software to become a special-purpose processor, the processor can be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In implementations in which multiple hardware modules are configured or instantiated at different times, communications between such hardware modules can be achieved, for example, through the storage and retrieval of information in memory structures to which the multiple hardware modules have access. For example, one hardware module can perform an operation and store the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors can constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors can also operate to support performance of the relevant operations in a "cloud computing" environment or as a "software as a service" (SaaS). For example, at least some of the operations can be performed by a group of computers (as examples of machines including processors), with these operations being accessible via a network (e.g., the Internet) and via one or more appropriate interfaces (e.g., an API).

The performance of certain of the operations can be distributed among the processors, not only residing within a single machine, but deployed across a number of machines. In some example implementations, the processors or processor-implemented modules can be located in a single geographic location (e.g., within a home environment, an office environment, or a server farm). In other example implementations, the processors or processor-implemented modules can be distributed across a number of geographic locations.

The modules, methods, applications, and so forth described in conjunction with FIGS. 1-2 are implemented in some implementations in the context of a machine and an associated software architecture. The sections below describe representative software architecture(s) and machine (e.g., hardware) architecture(s) that are suitable for use with the disclosed implementations.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture can yield a smart device for use in the "internet of things," while yet another combination produces a server computer for use within a cloud computing architecture. Not all combinations of such software and hardware architectures are presented here, as those of skill in the art can readily understand how to implement the inventive subject matter in different contexts from the disclosure contained herein.

FIG. 3 is a block diagram illustrating components of a machine 300, according to some example implementations, able to read instructions from a machine-readable medium (e.g., a machine-readable storage medium) and perform any one or more of the methodologies discussed herein. Specifically, FIG. 3 shows a diagrammatic representation of the machine 300 in the example form of a computer system, within which instructions 316 (e.g., software, a program, an application, an applet, an app, or other executable code) for causing the machine 300 to perform any one or more of the methodologies discussed herein can be executed. The instructions 316 transform the non-programmed machine into a particular machine programmed to carry out the described and illustrated functions in the manner described. In alternative implementations, the machine 300 operates as a standalone device or can be coupled (e.g., networked) to other machines. In a networked deployment, the machine 300 can operate in the capacity of a server machine or a client machine in a server-client network environment, or as a peer machine in a peer-to-peer (or distributed) network environment. The machine 300 can comprise, but not be limited to, a server computer, a client computer, PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 316, sequentially or otherwise, that specify actions to be taken by the machine 300. Further, while only a single machine 300 is illustrated, the term "machine" shall also be taken to include a collection of machines 300 that individually or jointly execute the instructions 316 to perform any one or more of the methodologies discussed herein.

The machine 300 can include processors 310, memory/storage 330, and I/O components 350, which can be configured to communicate with each other such as via a bus 302. In an example implementation, the processors 310 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) can include, for example, a processor 312 and a processor 314 that can execute the instructions 316. The term "processor" is intended to include multi-core processors that can comprise two or more independent processors (sometimes referred to as "cores") that can execute instructions contemporaneously. Although FIG. 3 shows multiple processors 310, the machine 300 can include a single processor with a single core, a single processor with multiple cores (e.g., a multi-core processor), multiple processors with a single core, multiple processors with multiples cores, or any combination thereof.

The memory/storage 330 can include a memory 332, such as a main memory, or other memory storage, and a storage unit 336, both accessible to the processors 310 such as via the bus 302. The storage unit 336 and memory 332 store the instructions 316 embodying any one or more of the methodologies or functions described herein. The instructions 316 can also reside, completely or partially, within the memory 332, within the storage unit 336, within at least one of the processors 310 (e.g., within the processor's cache memory), or any suitable combination thereof, during execution thereof by the machine 300. Accordingly, the memory 332, the storage unit 336, and the memory of the processors 310 are examples of machine-readable media.

As used herein, "machine-readable medium" means a device able to store instructions (e.g., instructions 316) and data temporarily or permanently and can include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 316. The term "machine-readable medium" shall also be taken to include any medium, or combination of multiple media, that is capable of storing instructions (e.g., instructions 316) for execution by a machine (e.g., machine 300), such that the instructions, when executed by one or more processors of the machine (e.g., processors 310), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 350 can include a wide variety of components to receive input, provide output, produce output, transmit information, exchange information, capture measurements, and so on. The specific I/O components 350 that are included in a particular machine will depend on the type of machine. For example, portable machines such as mobile phones will likely include a touch input device or other such input mechanisms, while a headless server machine will likely not include such a touch input device. It will be appreciated that the I/O components 350 can include many other components that are not shown in FIG. 3. The I/O components 350 are grouped according to functionality merely for simplifying the following discussion and the grouping is in no way limiting. In various example implementations, the I/O components 350 can include output components 352 and input components 354. The output components 352 can include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 354 can include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example implementations, the I/O components 350 can include biometric components 356, motion components 358, environmental components 360, or position components 362, among a wide array of other components. For example, the biometric components 356 can include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 358 can include acceleration sensor components (e.g., accelerometer), gravitation sensor components, rotation sensor components (e.g., gyroscope), and so forth. The environmental components 360 can include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that can provide indications, measurements, or signals corresponding to a surrounding physical environment. The position components 362 can include location sensor components (e.g., a Global Position System (GPS) receiver component), altitude sensor components (e.g., altimeters or barometers that detect air pressure from which altitude can be derived), orientation sensor components (e.g., magnetometers), and the like.

Communication can be implemented using a wide variety of technologies. The I/O components 350 can include communication components 364 operable to couple the machine 300 to a network 380 or devices 370 via a coupling 382 and a coupling 372, respectively. For example, the communication components 364 can include a network interface component or other suitable device to interface with the network 380. In further examples, the communication components 364 can include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 370 can be another machine or any of a wide variety of peripheral devices (e.g., a peripheral device coupled via a USB).

Moreover, the communication components 364 can detect identifiers or include components operable to detect identifiers. For example, the communication components 364 can include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information can be derived via the communication components 364, such as location via Internet Protocol (IP) geolocation, location via Wi-Fi® signal triangulation, location via detecting an NFC beacon signal that can indicate a particular location, and so forth.

In various example implementations, one or more portions of the network 380 can be an ad hoc network, an intranet, an extranet, a virtual private network (VPN), a local area network (LAN), a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 380 or a portion of the network 380 can include a wireless or cellular network and the coupling 382 can be a Code Division Multiple Access (CDMA) connection, a Global System for Mobile communications (GSM) connection, or another type of cellular or wireless coupling. In this example, the coupling 382 can implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 316 can be transmitted or received over the network 380 using a transmission medium via a network interface device (e.g., a network interface component included in the communication components 364) and utilizing any one of a number of well-known transfer protocols (e.g., HTTP). Similarly, the instructions 316 can be transmitted or received using a transmission medium via the coupling 372 (e.g., a peer-to-peer coupling) to the devices 370. The term "transmission medium" shall be taken to include any intangible medium that is capable of storing, encoding, or carrying the instructions 316 for execution by the machine 300, and includes digital or analog communications signals or other intangible media to facilitate communication of such software.

Throughout this specification, plural instances can implement components, operations, or structures described as a single instance. Although individual operations of one or more methods are illustrated and described as separate operations, one or more of the individual operations can be performed concurrently, and nothing requires that the operations be performed in the order illustrated. Structures and functionality presented as separate components in example configurations can be implemented as a combined structure or component. Similarly, structures and functionality presented as a single component can be implemented as separate components. These and other variations, modifications, additions, and improvements fall within the scope of the subject matter herein.

Although an overview of the inventive subject matter has been described with reference to specific example implementations, various modifications and changes can be made to these implementations without departing from the broader scope of implementations of the present disclosure. Such implementations of the inventive subject matter can be referred to herein, individually or collectively, by the term "invention" merely for convenience and without intending to voluntarily limit the scope of this application to any single disclosure or inventive concept if more than one is, in fact, disclosed.

The implementations illustrated herein are described in sufficient detail to enable those skilled in the art to practice the teachings disclosed. Other implementations can be used and derived therefrom, such that structural and logical substitutions and changes can be made without departing from the scope of this disclosure. The Detailed Description, therefore, is not to be taken in a limiting sense, and the scope of various implementations is defined only by the appended claims, along with the full range of equivalents to which such claims are entitled.

As used herein, the term "or" can be construed in either an inclusive or exclusive sense. Moreover, plural instances can be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and can fall within a scope of various implementations of the present disclosure. In general, structures and functionality presented as separate resources in the example configurations can be implemented as a combined structure or resource. Similarly, structures and functionality presented as a single resource can be implemented as separate resources. These and other variations, modifications, additions, and improvements fall within a scope of implementations of the present disclosure as represented by the appended claims. The specification and drawings are, accordingly, to be regarded in an illustrative rather than a restrictive sense.

What is claimed is:

1. A method comprising:

receiving, from a user device, a plurality of hashed representations of network addresses generated by a privacy engine executing on the user device, each of the network addresses corresponding to a first transaction initiated between an application executing on the user device and one or more third-party services;

comparing, by a server, the plurality of hashed representations with an index of one or more enrolled network addresses to identify a source through which the application executing on the user device initiated the first transaction with a first third-party service;

based on (a) the identification of the source through which the application executing on the user device initiated the first transaction with the first third-party service and (b) a completion of a second transaction originating from a second third-party service and corresponding to the first transaction, initiating, within a decentralized network, a conversion of one or more elements associated with the second transaction into one or more digital tokens stored at one or more nodes of the decentralized network;

receiving, at the server and in response to the conversion operation, the one or more digital tokens;

storing at least one of the one or more digital tokens, as encrypted via one or more first cryptographic keys in a wallet generated by a server to store digital tokens with respect to a first entity and in relation to one or more aspects of the first transaction;

receiving a request from the user device to transfer via the decentralized network a digital token stored in the wallet associated with the first entity and at least one of the one or more aspects of the first transaction; and transferring the digital token within the decentralized network to a second entity in response to the request.

2. The method of claim 1, wherein initiating a conversion comprises allocating the one or more digital tokens to the first entity.

3. The method of claim 1, wherein initiating a conversion comprises initiating an exchange with respect to the one or more digital tokens and the first entity.

4. The method of claim 1, wherein transferring the digital token comprises transferring the digital token to an entity associated with the first transaction in response to the request.

5. A non-transitory computer readable medium having instructions stored thereon that, when executed by a processing device, cause the processing device to perform operations comprising:

receiving, from a user device, a plurality of hashed representations of network addresses generated by a privacy engine executing on the user device, each of the network addresses corresponding to a first transaction initiated between an application executing on the user device and one or more third-party services;

comparing the plurality of hashed representations with an index of one or more enrolled network addresses to identify a source through which the application executing on the user device initiated the first transaction with a first third-party service;

based on (a) the identification of the source through which the application executing on the user device initiated the first transaction with the first third-party service and (b) a completion of a second transaction originating from a second third-party service and corresponding to the first transaction, initiating, within a decentralized network, a conversion of one or more elements associated with the second transaction into one or more digital tokens stored at one or more nodes of the decentralized network;

receiving in response to the conversion operation, the one or more digital tokens;

storing at least one of the one or more digital tokens, as encrypted via one or more first cryptographic keys in a wallet generated by a server to store digital tokens with respect to a first entity and in relation to one or more aspects of the first transaction;

receiving a request from the user device to transfer via the decentralized network a digital token stored in the wallet associated with the first entity and at least one of the one or more aspects of the first transaction; and transferring the digital token within the decentralized network to a second entity in response to the request.

6. The non-transitory computer readable medium of claim 5, wherein initiating a conversion comprises allocating the one or more digital tokens to the first entity.

7. The non-transitory computer readable medium of claim 5, wherein initiating a conversion comprises initiating an exchange with respect to the one or more digital tokens and the first entity.

8. The non-transitory computer readable medium of claim 5, wherein storing at least one of the one or more digital tokens comprises transferring at least one of the one or more digital tokens to cold storage.

9. The non-transitory computer readable medium of claim 5, wherein transferring the digital token comprises transferring the digital token to an entity associated with the first transaction in response to the request.

10. The non-transitory computer readable medium of claim 5, wherein storing at least one of the one or more digital tokens further comprises storing at least one of the one or more digital tokens, as secured via one or more second cryptographic keys, on cold storage.

11. The non-transitory computer readable medium of claim 10, wherein storing at least one of the one or more digital tokens further comprises generating a new cryptographic key with respect to the digital tokens as stored on cold storage.

12. The method of claim 1, wherein storing at least one of the one or more digital tokens comprises transferring at least one of the one or more digital tokens to cold storage.

13. The method of claim 1, wherein storing at least one of the one or more digital tokens further comprises storing at least one of the one or more digital tokens, as secured via one or more second cryptographic keys, on cold storage.

14. A system comprising:

a processing device; and a memory coupled to the processing device and storing instructions that, when executed by the processing device, cause the system to perform operations comprising:

receiving, from a user device, a plurality of hashed representations of network addresses generated by a privacy engine executing on the user device, each of the network addresses corresponding to a first transaction initiated between an application executing on the user device and one or more third-party services;

comparing the plurality of hashed representations with an index of one or more enrolled network addresses to identify a source through which the application executing on the user device initiated the first transaction with a first third-party service;

based on (a) the identification of the source through which the application executing on the user device initiated the first transaction with the first third-party service and (b) a completion of a second transaction originating from a second third-party service and corresponding to the first transaction, initiating, within a decentralized network, a conversion of one or more elements associated with the second transaction into one or more digital tokens stored at one or more nodes of the decentralized network;

receiving in response to the conversion operation, the one or more digital tokens;

storing at least one of the one or more digital tokens, as encrypted via one or more first cryptographic keys in a wallet generated by a server to store digital tokens with respect to a first entity and in relation to one or more aspects of the first transaction;

receiving a request from the user device to transfer via the decentralized network a digital token stored in the wallet associated with the first entity and at least one of the one or more aspects of the first transaction; and transferring the digital token within the decentralized network to a second entity in response to the request.

15. The system of claim 14, wherein initiating a conversion comprises allocating the one or more digital tokens to the first entity.

16. The system of claim 14, wherein initiating a conversion comprises initiating an exchange with respect to the one or more digital tokens and the first entity.

17. The system of claim 14, wherein storing at least one of the one or more digital tokens comprises transferring at least one of the one or more digital tokens to cold storage.

18. The system of claim 14, wherein transferring the digital token comprises transferring the digital token to an entity associated with the first transaction in response to the request.

19. The system of claim 14, wherein storing at least one of the one or more digital tokens further comprises storing at least one of the one or more digital tokens, as secured via one or more second cryptographic keys, on cold storage.

20. The system of claim 19, wherein storing at least one of the one or more digital tokens further comprises generating a new cryptographic key with respect to the digital tokens as stored on cold storage.

* * * * *